US 6,721,109 B1

(12) United States Patent
Uriarte

(10) Patent No.: US 6,721,109 B1
(45) Date of Patent: Apr. 13, 2004

(54) TEXT MAGNIFYING DEVICE

(76) Inventor: Ricardo Uriarte, 426 W. Donovan St., Santa Maria, CA (US) 93454

( * ) Notice: Subject to any disclaimer, the term of this patent is extended or adjusted under 35 U.S.C. 154(b) by 0 days.

(21) Appl. No.: 10/292,288

(22) Filed: Nov. 12, 2002

Related U.S. Application Data

(63) Continuation-in-part of application No. 09/767,073, filed on Jan. 23, 2001, now abandoned.

(51) Int. Cl.[7] ............................................. G02B 27/02
(52) U.S. Cl. ................... 359/802; 359/804; 359/805
(58) Field of Search ..................... 359/801–811, 819, 359/822, 609, 610, 612, 613, 817; 248/291, 298, 316.5

(56) References Cited

U.S. PATENT DOCUMENTS

| 4,457,585 A | * | 7/1984 | DuCorday ................. 359/441 |
| 4,958,907 A | * | 9/1990 | Davis ....................... 359/809 |
| 5,493,451 A | * | 2/1996 | Cosey, Sr. ................. 359/817 |
| 6,574,051 B1 | * | 6/2003 | Powell ...................... 359/802 |

* cited by examiner

Primary Examiner—Georgia Epps
Assistant Examiner—Joseph Martinez
(74) Attorney, Agent, or Firm—Goldstein Law Offices, P.C.

(57) ABSTRACT

A text magnifying device including a magnifying cavity having an upper surface, a lower surface, and a pair of sides. The upper surface and lower surface are convex. A pair of elevational bars, each have an inner surface, and are attached to and extend longitudinally along the sides. V-shaped notches extend into the inner surface of the elevational bars and allow H-shaped legs to be inserted therein to raise the magnifying cavity above subject text to be read.

6 Claims, 4 Drawing Sheets

TEXT MAGNIFYING DEVICE

CROSS REFERENCES AND RELATED SUBJECT MATTER

This application is a continuation-in-part of patent application Ser. No. 09/767,073, filed in the United States Patent Office on Jan. 23, 2001 now abandoned.

BACKGROUND OF THE INVENTION

The present invention relates to a text magnifying device and more particularly pertains to enlarging text so as to enable the text to be easily read.

The use of magnifying devices is known in the prior art. More specifically, magnifying devices heretofore devised and utilized for the purpose of magnifying items are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe a text magnifying device for enlarging text so as to enable the text to be easily read.

In this respect, the text magnifying device according to the present invention substantially departs from the conventional concepts and designs of the prior art, and in doing so provides an apparatus primarily developed for the purpose of enlarging text so as to enable the text to be easily read.

Therefore, it can be appreciated that there exists a continuing need for a new and improved text magnifying device which can be used for enlarging text so as to enable the text to be easily read. In this regard, the present invention substantially fulfills this need.

SUMMARY OF THE INVENTION

In the view of the foregoing disadvantages inherent in the known types of magnifying devices now present in the prior art, the present invention provides an improved text magnifying device. As such, the general purpose of the present invention, which will be described subsequently in greater detail, is to provide a new and improved text magnifying device which has all the advantages of the prior art and none of the disadvantages.

To attain this, the present invention essentially comprises a magnifying cavity defined by a generally rectangular periphery. The periphery has a pair of elevational bars extending downwardly therefrom. A pair of H-shaped legs can be used to increase the height of the magnifying cavity.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved text magnifying device which is capable of magnifying text over a large printed area. Accordingly, the text magnifying device employs an elongated magnified cavity.

It is another object of the present invention to provide a new and improved text magnifying device which may be conveniently used. Accordingly, a pair of elevation bars hold the magnified cavity over the subject text, and prevent the magnified cavity from becoming scratched.

It is yet another object of the invention to elevate the magnified cavity a substantial distance above the subject text. Accordingly, a pair of attachable H-legs are selectively mountable between the elevation bars, at opposite ends thereof.

It is further object of the invention to provide a text magnifying device which enhances the readability of the text. Accordingly, the magnified cavity is preferably tinted, and is coated with an anti-reflective coating.

It is a still further object of the present invention to provide a new and improved text magnifying device which is of durable and reliable construction.

An even further object of the present invention is to provide a new and improved text magnifying device which is susceptible of a low cost of manufacture with regard to both materials and labor, and which accordingly is then susceptible of low prices of sale to the consuming public, thereby making such a text magnifying device economically available to the buying public.

Even still another object of the present invention is to provide a new and improved text magnifying device for enlarging text so as to enable the text to be easily read.

The invention is a text magnifying device including a magnifying cavity having an upper surface, a lower surface, and a pair of sides. The upper surface and lower surface are convex. A pair of elevational bars, each have an inner surface, and are attached to and extend longitudinally along the sides. V-shaped notches extend into the inner surface of the elevational bars and allow H-shaped legs to be inserted therein to raise the magnifying cavity above subject text to be read.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
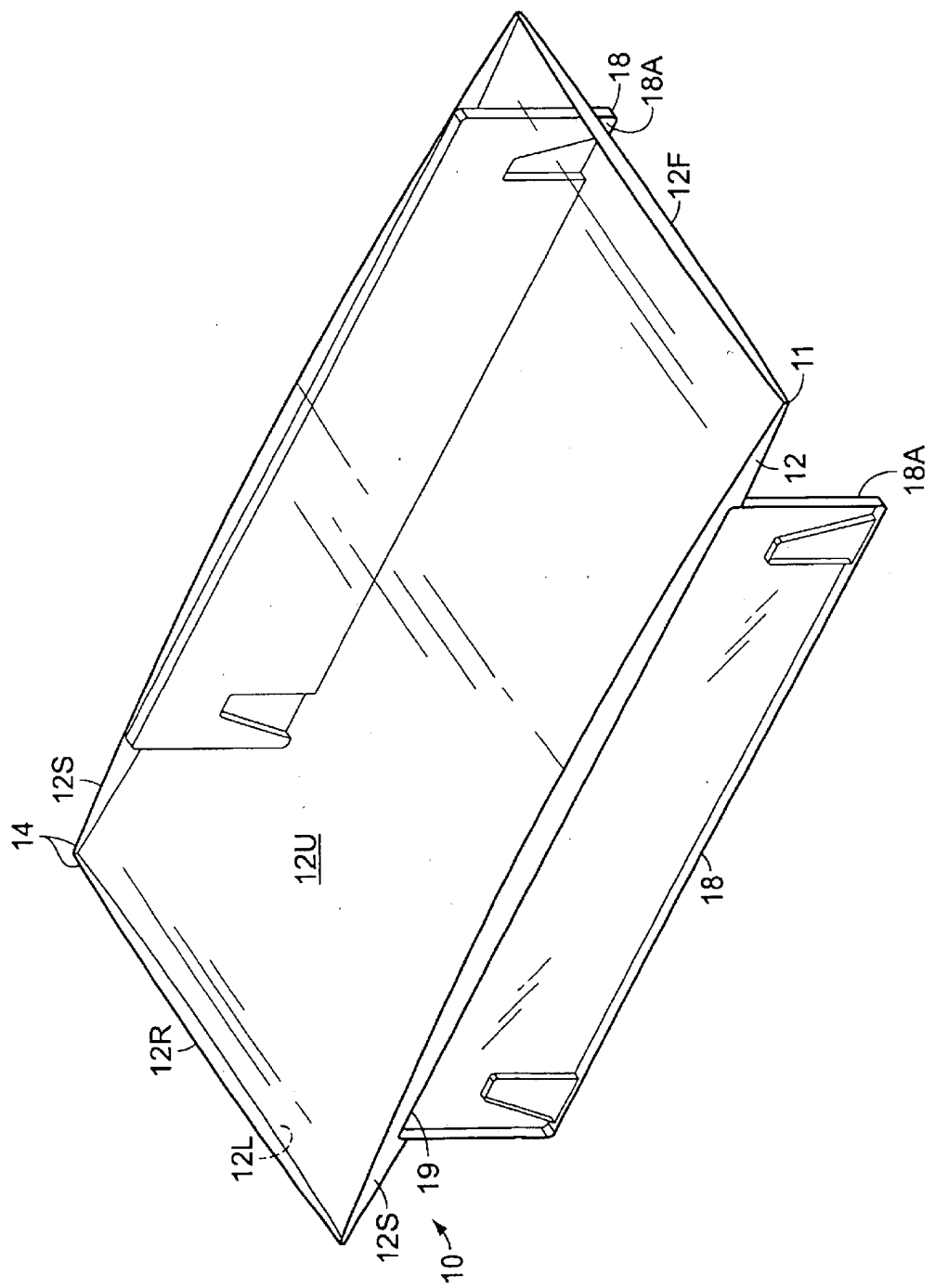
FIG. 1 is a perspective view of the preferred embodiment of the text magnifying device constructed in accordance with the principles of the present invention.
Figure 2:
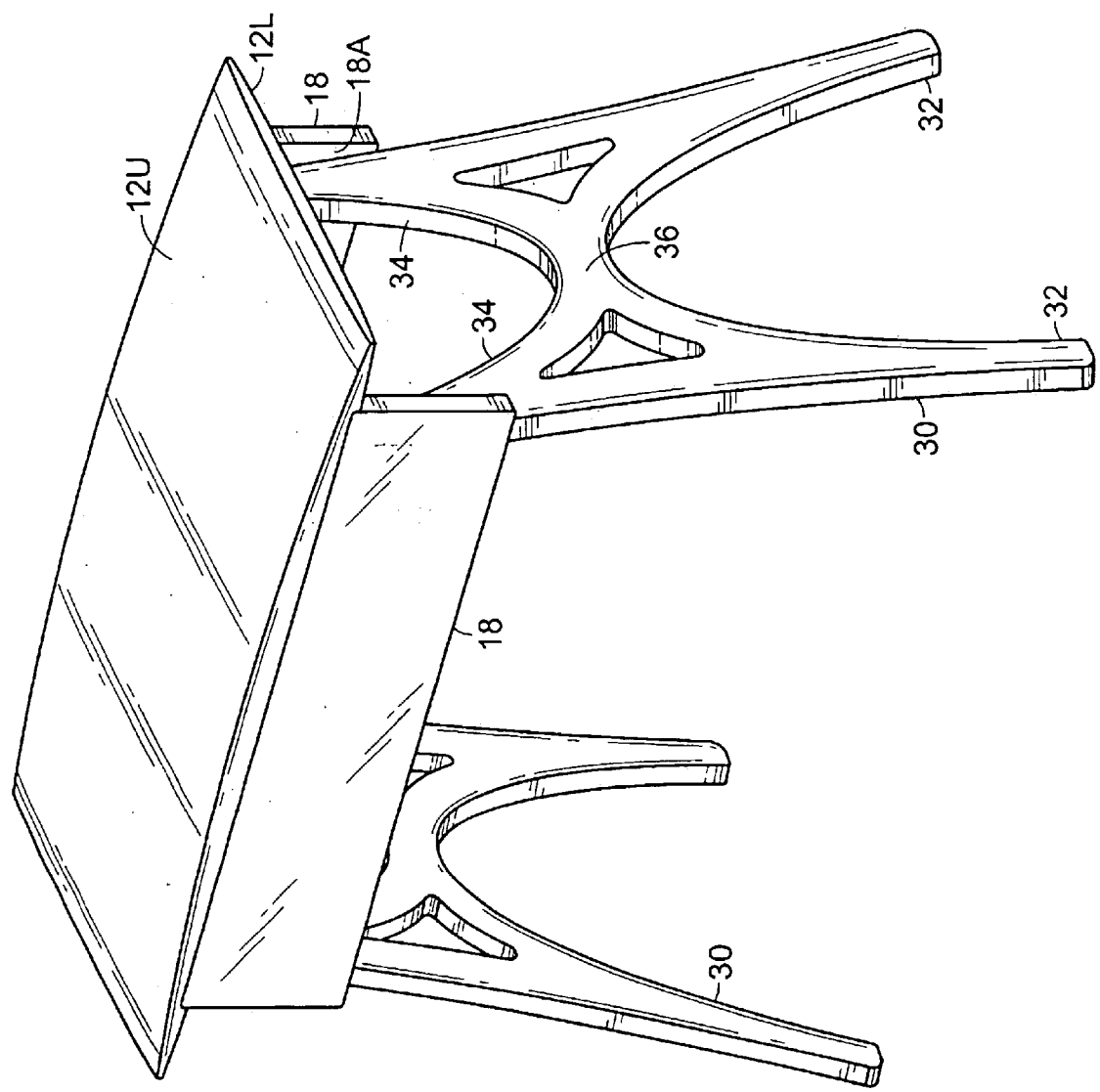
FIG. 2 is a perspective view of the present invention with the H-shaped extension legs attached to the elevation bars.
Figure 4:
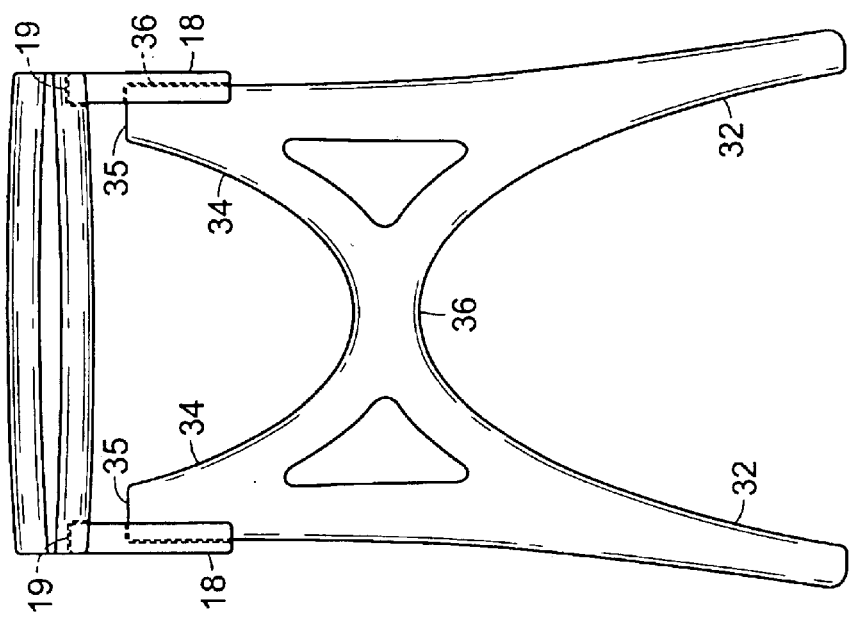
FIG. 4 is a front elevational view thereof.
Figure 3:
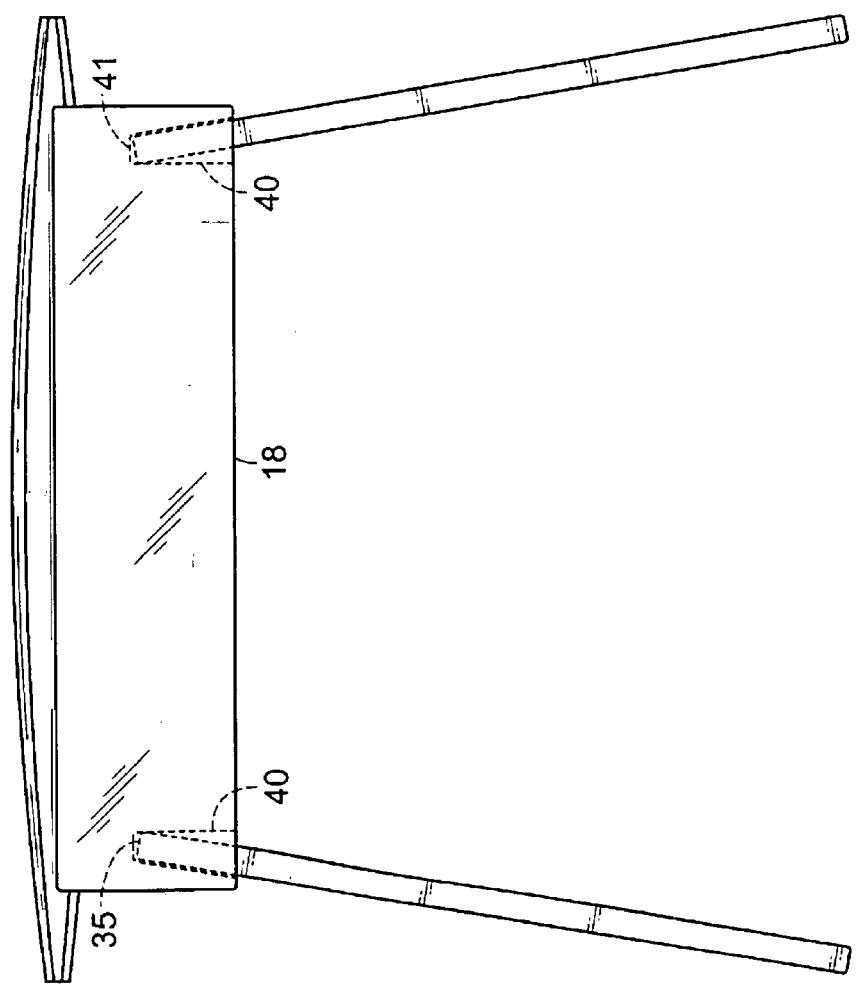
FIG. 3 is a side view thereof.
Figure 5:
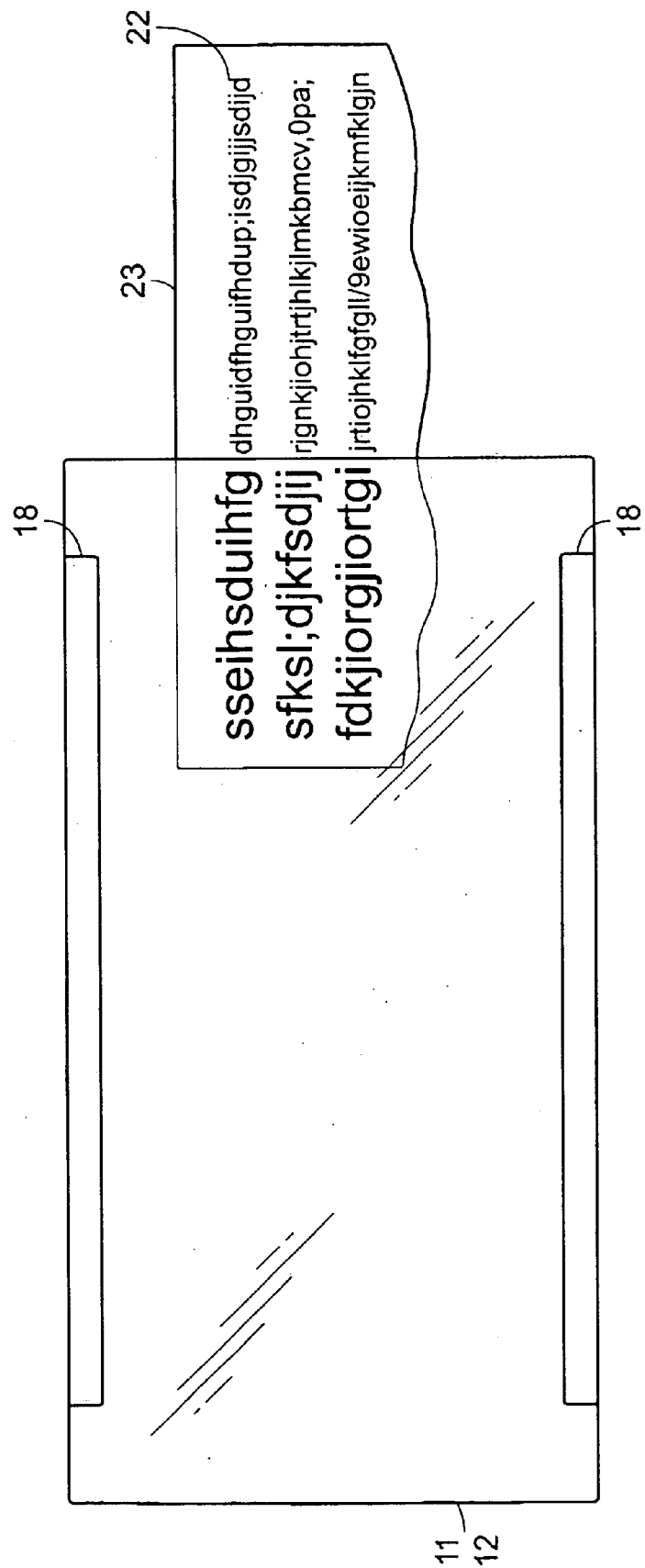
FIG. 5 is a top plan view, showing the text magnifying device being used to magnify subject text printed on a page.

With reference now to the drawings, and in particular, to FIGS. 1 through 5 thereof, the preferred embodiment of the new and improved text magnifying device embodying the principles and concepts of the present invention and generally designated by the reference number 10 will be described.

Specifically, it will be noted in the various Figures that the device relates to a text magnifying device for enlarging text so as to enable the text to be easily read. In its broadest context, the device comprises of a magnifying portion and a pair of H-shaped extension legs. Such components are individually configured and correlated with respect to each other so as to attain the desired objective.

The magnifying portion 11 includes a magnifying cavity 12 is defined by a generally rectangular periphery 14, having a front 12F, a rear 12R, an upper surface 12U, a lower surface 12L, and a pair of sides 12S. The upper surface 12U and lower surface 12L of the magnifying cavity 12 is substantially convex between the front 12F and rear 12R as shown, or between the sides 12S. The magnifying cavity 12 is substantially transparent, magnifies objects below the lower surface 12L when viewed from above, and is preferably made of acrylic plastic or polycarbonate. Attached to at the sides 12S is a pair of elevational bars 18 extending downwardly from the lower surface 12L. The elevational bars 18 are substantially flat and slab-like, and extend perpendicular to the magnifying portion and parallel to each other. Longitudinal notches 19 extend into each side 12S of the magnifying portion 11, at the lower surface 12L thereof to create a secure joint for attachment of the elevational bars 18. Each of the elevational bars 18 has an inner surface 18A which faces the other elevational bar 18. The elevational bars 18 allow for easy handling of the device 10, and prevents the magnifying cavity from becoming scratched, since contact with the lower surface 12L of the magnifying portion 11 does not take place during ordinary usage of the magnifying device 10. A user can grasp the elevational bars 18 and hold it over text 22 so as to enlarge the text 22 for easier reading. The user can also rest the magnifying portion 11 upon a surface 23 bearing the text 22, such that the elevational bars 18 rest upon that surface. Note FIG. 4.

The magnifying device has H-shaped legs 30 which selectively attach between the elevational bars 18 to support the magnifying portion 11 at a greater distance over the subject text 22 to be read. The H-shaped legs 30 each have a pair of lower members 32, a pair of upper members 34, and a cross support 36. Each cross support 36 connects both upper members 34 and lower members 32 of that H-shaped leg 30. The upper members 34 have a top surface 35 and an outer surface 36.

Each of the elevation bars 18 has a pair of vertically extending V-notches 40 on its inner surface 18A. Each of the V-notches 40 accommodates one of the upper members 34 of one of the H-shaped legs 30. Accordingly, the H-shaped legs 30 extend transversely across the magnifying portion 11 between the elevation bars 18 to selectively support the magnifying portion 11 and suspend the same a significant height above the target text. The inverted V-shape of the V-shaped notches 40 allows the H-shaped legs 30 to bow outward toward the front 12F and rear 12R to provide additional stability to the magnifying portion 11. However, it should be noted that the V-shape is modified, such that it is flattened, having a substantially flat notch top 41, to accommodate the top surface 35 of the upper members 34. Thus, the notches 40 do not actually 'come to a point'.

The magnifying cavity 12 is preferably made of polycarbonate plastic, or other clear material. In addition, the magnifying cavity 12 can be lightly tinted with a color dye incorporated within and throughout the material from which it is made, during molding thereof the aid the user in focusing upon text they view with the device 10 and to provide a colored appearance. In particular, color dye chips can be added during injection molding. Still further, a forty-five to ninety degree anti-reflective coating can be used upon the upper surface 12U to prevent glare while using the magnifying device.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A text magnifying device for enlarging text so as to enable the text to be easily read, comprising:

a magnifying cavity defined by a generally rectangular periphery having a pair of sides, a front, a rear, an upper surface, and a lower surface, the upper surface and lower surface are convex, the magnifying cavity being substantially transparent and magnifying objects below the lower surface when viewed from above the upper surface;

a pair of elevational bars, each elevational bar having an inner surface and attaching to and extending longitudinally along one of the sides such that the inner surfaces of the elevational bars face and extend substantially parallel to each other, each elevational bar having a pair of vertically extending notches on its inner surface, each elevational bar extending downward from the lower surface of the magnifying cavity; and a magnifying glass disposed within the magnifying cavity.

2. A The text magnifying device as recited in claim 1, further comprising a pair of H-shaped legs, each H-shaped leg having a pair of lower members and a pair of upper members, and a cross support connecting all lower and upper members of that H-shaped leg, the upper members engaging the vertically extending notches, such that each H-shaped leg extends transversely between the elevational bars for supporting the magnifying cavity and raising its height.

3. The text magnifying device as recited in claim 2, wherein each vertically extending notch has an inverted V-shape having a substantially flat notch top for allowing the H-shaped legs to bow outward toward the front and rear, respectively, to provide additional stability to the magnifying device when supported upon the H-shaped legs.

4. The text magnifying device as recited in claim 3, wherein the magnifying cavity has a pair of longitudinal notches extending into the sides and upward from the lower surface, the longitudinal notches seating the elevational bars for a stronger joint therebetween.

5. The text magnifying device as recited in claim 4, wherein the magnifying cavity has an anti-reflective coating on its upper surface.

6. The text magnifying device as recited in claim 5, wherein the magnifying cavity is fabricated with an incorporated colored dye to provide a color tinted appearance.

* * * * *